US010314107B2

(12) United States Patent
Yamauchi

(10) Patent No.: US 10,314,107 B2
(45) Date of Patent: Jun. 4, 2019

(54) COMMUNICATION DEVICE, COMMUNICATION METHOD, AND COMMUNICATION SYSTEM

(71) Applicant: Mitsubishi Electric Corporation, Tokyo (JP)

(72) Inventor: Takahisa Yamauchi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/549,008

(22) PCT Filed: Apr. 21, 2015

(86) PCT No.: PCT/JP2015/062154
§ 371 (c)(1),
(2) Date: Aug. 4, 2017

(87) PCT Pub. No.: WO2016/170607
PCT Pub. Date: Oct. 27, 2016

(65) Prior Publication Data
US 2018/0098362 A1    Apr. 5, 2018

(51) Int. Cl.
*H04W 4/00*    (2018.01)
*H04W 76/40*    (2018.01)
(Continued)

(52) U.S. Cl.
CPC .............. *H04W 76/40* (2018.02); *H04B 3/54* (2013.01); *H04L 1/08* (2013.01); *H04W 24/06* (2013.01);
(Continued)

(58) Field of Classification Search
CPC ..... H04W 72/12; H04L 47/805; H04L 47/826
See application file for complete search history.

(56) References Cited

U.S. PATENT DOCUMENTS 5,682,381 A * 10/1997 Sekihata ........... H04W 72/1231
370/332
6,151,311 A * 11/2000 Wheatley, III ....... H04B 1/7075
370/335
(Continued)

FOREIGN PATENT DOCUMENTS

CN    103814563 A    5/2014
JP    5-97142 U    12/1993
(Continued)

OTHER PUBLICATIONS

Radio Communication Device and Radio Communication System JP-2014-183470-A.*
(Continued)

*Primary Examiner* — Asad M Nawaz
*Assistant Examiner* — Syed Ali
(74) *Attorney, Agent, or Firm* — Sughrue Mion, PLLC; Richard C. Turner

(57) ABSTRACT

A communication device that wirelessly communicates with a plurality of wireless slave stations includes: a wireless network control unit that acquires network configuration information including the number of repeating stages between the communication device and the plurality of wireless slave stations and the number of wireless slave stations that is the total number of the plurality of wireless slave stations; a parameter management unit that stores a delay time for communication; and a communication cycle calculation unit that calculates a communication cycle based on the network configuration information and the delay time.

16 Claims, 11 Drawing Sheets

(51) Int. Cl.
  *H04L 1/08*  (2006.01)
  *H04W 24/06*  (2009.01)
  *H04B 3/54*  (2006.01)
  *H04W 74/08*  (2009.01)
  *H04W 84/18*  (2009.01)

(52) U.S. Cl.
  CPC ... *H04W 74/085* (2013.01); *H04B 2203/5445* (2013.01); *H04W 84/18* (2013.01)

(56) References Cited

U.S. PATENT DOCUMENTS

| | | |
|---|---|---|
| 2006/0193274 A1 | 8/2006 | Yamagata |
| 2007/0287542 A1 | 12/2007 | Miyazaki et al. |
| 2009/0075588 A1* | 3/2009 | Zhu .................. H04B 7/155 455/18 |
| 2010/0178051 A1* | 7/2010 | Mizutani ............ H04J 3/0652 398/25 |
| 2011/0261706 A1 | 10/2011 | Fujiwara et al. |
| 2012/0057620 A1* | 3/2012 | Yamamoto ........... H04W 48/10 375/211 |
| 2013/0343365 A1* | 12/2013 | Hollabaugh .......... H04W 56/00 370/338 |
| 2014/0198658 A1 | 7/2014 | Ajima et al. |
| 2016/0080208 A1* | 3/2016 | Takemoto ............. H04L 12/44 398/66 |
| 2016/0295536 A1* | 10/2016 | Alriksson ........... H04W 56/005 |

FOREIGN PATENT DOCUMENTS

| | | |
|---|---|---|
| JP | 2000-267892 A | 9/2000 |
| JP | 2004-023564 A | 1/2004 |
| JP | 2006-174263 A | 6/2006 |
| JP | 2006-222608 A | 8/2006 |
| JP | 2007-296127 A | 11/2007 |
| JP | 2008-228186 A | 9/2008 |
| JP | 2013-172179 A | 9/2013 |
| JP | 2014-183470 A | 9/2014 |
| WO | 2010/044210 A1 | 4/2010 |

OTHER PUBLICATIONS

Radio Communication Device and Radio Communication System JP-2014-183470-A, published 2014.*
Taiwan Office Action for Application No. 10521615900 dated Dec. 30, 2016.
International Search Report for PCT/JP2015/062154 dated Jul. 21, 2015 [PCT/ISA/210].
Communication dated Mar. 27, 2018 from the German Patent and Trademark Office in counterpart German Application No. 11 2015 006 175.4.
Communication dated Apr. 20, 2018 from the Korean Intellectual Property Office in counterpart Application No. 10-2017-7029884.
Communication dated Jun. 5, 2018, from the State Intellectual Property Office of People's Republic of China in counterpart Application No. 201580079108.7.

* cited by examiner

COMMUNICATION DEVICE, COMMUNICATION METHOD, AND COMMUNICATION SYSTEM

CROSS REFERENCE TO RELATED APPLICATIONS

This application is a National Stage of International Application No. PCT/JP2015/062154, filed on Apr. 21, 2015, the contents of all of which are incorporated herein by reference in their entirety.

FIELD

The present invention relates to a communication device that performs wireless communication, a communication method, and a communication system.

BACKGROUND

Data collection in a large-scale network with specified low-power radio stations (Article 6(4) (ii) of the Enforcement Regulations for the Radio Act) has been studied. The data collection in a large-scale network is exemplified by telemetering, in which the amount measured in a remote place is transmitted to be displayed or recorded in another place, or monitoring in a large-scale factory.

The physical layer (PHY) and the medium access control (MAC) layer specified in IEEE 802.15.4 are used for the above network. The network is configured as a wireless multi-hop network, and can collect pieces of data from a large number of terminals that exist over a wide area.

An ad hoc network or a mesh network is included in the wireless multi-hop network.

In the communication between a wireless master station and a wireless slave station, the wireless multi-hop network can autonomously select and use, in accordance with a transmission environment, a transmission route through which the wireless master station and the wireless slave station directly communicate with each other or a transmission route through which the wireless master station and the wireless slave station communicate with each other via another wireless slave station.

In a star network in which the wireless master station and the wireless slave station communicate on a one-to-one basis, the transmission route between the wireless master station and the wireless slave station is fixed. Therefore, the quality of communication is degraded or communication is disabled as soon as the transmission environment is deteriorated.

In contrast, the wireless multi-hop network enables communication through a bypass transmission route, that is, communication via another wireless slave station. Therefore, communication can be continued even when the transmission environment is deteriorated.

In addition, in a case where the wireless multi-hop network has a large number of wireless slave stations, a plurality of options for transmission routes can be obtained. Therefore, redundancy of transmission routes is achieved, and the quality of communication can be stabilized.

Due to the above characteristics, the actual transmission routes in the wireless multi-hop network depend on the number of wireless slave stations, an installation environment, and the transmission environment. Therefore, it is difficult to determine the communication cycle.

As a related technique, following Patent Literature 1 describes a transmission environment evaluation device including an operation terminal, a wireless master station, and a plurality of wireless terminals. Specifically, configurations of communication routes are concurrently switched to the set configurations at the timing designated by the operation terminal. After that, parameters such as a route for measuring a transmission path environment and a repetitive measuring execution cycle are set, and the measurement is performed (paragraphs 0039 to 0052).

In addition, following Patent Literature 2 describes a multi-hop wireless network in which an information distribution server controls the size of data and data transmission intervals in accordance with an effective transmission rate and the total number of connected terminals (paragraphs 0056 to 0058).

CITATION LIST

Patent Literature

Patent Literature 1: Japanese Patent Application Laid-Open No. 2008-228186

Patent Literature 2: Japanese Patent Application Laid-Open No. 2006-174263

SUMMARY

Technical Problem

In the technique described in Patent Literature 2, however, it is not taken into consideration that the communication routes vary in accordance with the number of terminals, the installation environment, and the transmission environment. This causes the following problems.

In a case where a short communication cycle is set, traffic in the entire wireless network is congested, and the following problem occurs: the quality of transmission is liable to be deteriorated due to occurrence of a data collision in a wireless section.

In contrast, in a case where a long communication cycle is set despite light traffic in the entire wireless network, the following problem occurs: a substantial amount of time is required for data collection.

The present invention has been made in consideration of the above problems, and an object thereof is to obtain a communication device capable of suppressing a data collision in a wireless section and suppressing a delay in data collection.

Solution to Problem

In order to solve the problems and achieve the object, the present invention provides a communication device to wirelessly communicate with a plurality of wireless slave stations. The communication device includes a wireless network control unit to acquire network configuration information including the number of repeating stages between the communication device and the plurality of wireless slave stations and the number of wireless slave stations that is the total number of the plurality of wireless slave stations, a parameter management unit to store a delay time for communication, and a communication cycle calculation unit to calculate a communication cycle based on the network configuration information and the delay time.

Advantageous Effects of Invention

A communication device according to the present invention can achieve an effect of suppressing a data collision in a wireless section and suppressing a delay in data collection.

DESCRIPTION OF EMBODIMENTS

Hereinafter, a communication device, a communication method, and a communication system according to embodiments of the present invention will be described in detail based on the drawings. The present invention is not limited to the embodiments.

First Embodiment

Figure 1:
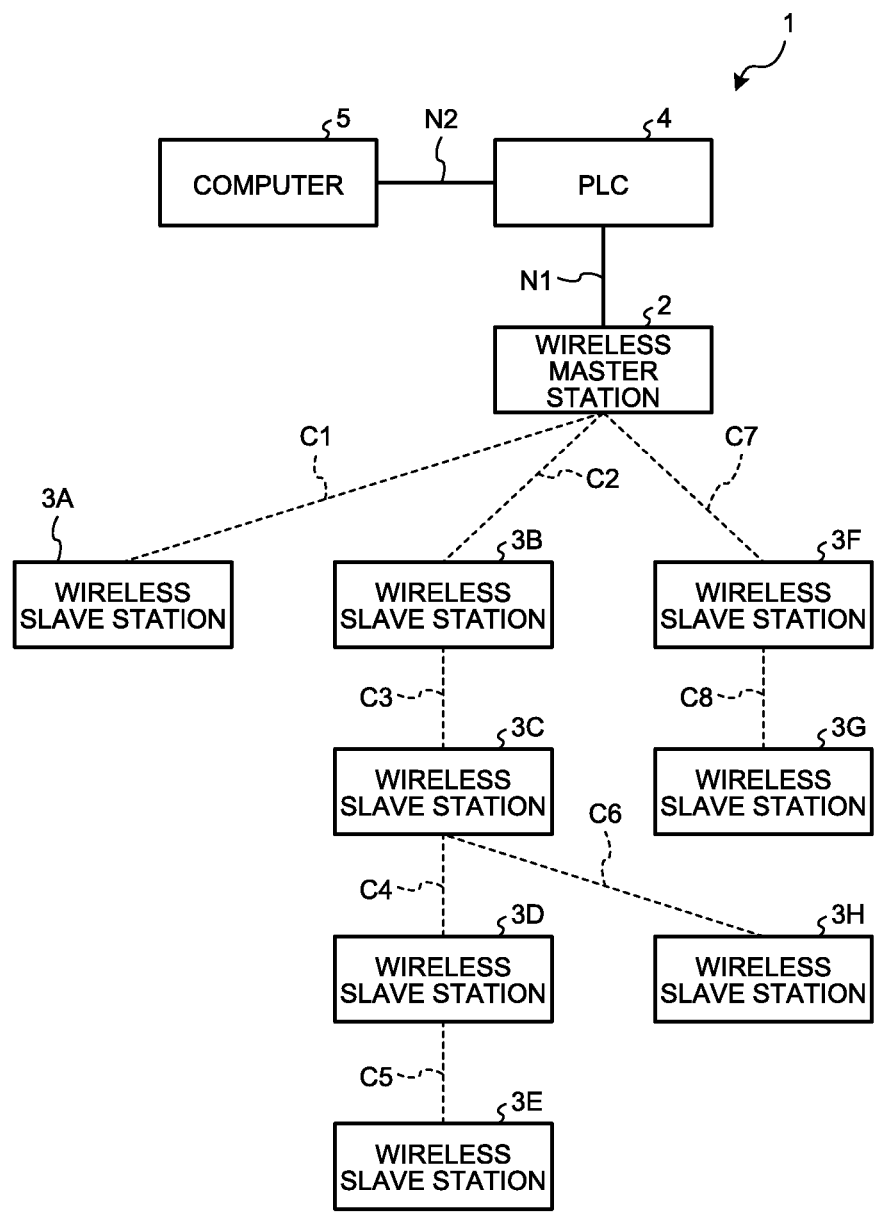
FIG. 1 is a diagram illustrating a configuration of a communication system according to a first embodiment.

FIG. 1 is a diagram illustrating a configuration of a communication system according to a first embodiment of the present invention. The communication system 1 includes a wireless master station 2 and wireless slave stations 3A, 3B, 3C, 3D, 3E, 3F, 3G, and 3H. The wireless master station 2 and the wireless slave stations 3A, 3B, 3C, 3D, 3E, 3F, 3G, and 3H perform wireless multi-hop communication. In other words, the communication system 1 is a wireless multi-hop network.

It should be noted that the communication system 1 is not limited to the wireless multi-hop network. The communication system 1 only needs to be a wireless network in which a communication cycle cannot be uniquely determined only by the number of wireless slave stations 3A, 3B, 3C, 3D, 3E, 3F, 3G, and 3H.

The wireless master station 2 corresponds to the communication device of the present invention.

Each of the wireless slave stations 3A, 3B, 3C, 3D, 3E, 3F, 3G, and 3H sends and receives data to and from the wireless master station 2. The data are exemplified by sensor information.

The wireless slave station 3A directly communicates with the wireless master station 2 via a transmission route C1. The wireless slave station 3B directly communicates with the wireless master station 2 via a transmission route C2.

The wireless slave station 3C communicates with the wireless master station 2 via the transmission route C2, the wireless slave station 3B, and a transmission route C3. The wireless slave station 3D communicates with the wireless master station 2 via the transmission route C2, the wireless slave station 3B, the transmission route C3, the wireless slave station 3C, and a transmission route C4.

The wireless slave station 3E communicates with the wireless master station 2 via the transmission route C2, the wireless slave station 3B, the transmission route C3, the wireless slave station 3C, the transmission route C4, the wireless slave station 3D, and a transmission route C5.

The wireless slave station 3F directly communicates with the wireless master station 2 via a transmission route C7. The wireless slave station 3G communicates with the wireless master station 2 via the transmission route C7, the wireless slave station 3F, and a transmission route C8.

The wireless slave station 3H communicates with the wireless master station 2 via the transmission route C2, the wireless slave station 3B, the transmission route C3, the wireless slave station 3C, and a transmission route C6.

The communication system 1 also includes a programmable controller (PLC, JIS B 3502: 2011) 4 and a computer 5.

The PLC 4 communicates with the wireless master station 2 via a wired network N1. The wired network N1 is exemplified by Ethernet (registered trademark). The PLC 4 periodically receives data received by the wireless master station 2.

The computer 5 communicates with the PLC 4 via a wired network N2. The wired network N2 is exemplified by Ethernet (registered trademark). An application program for monitoring and controlling data is installed on the computer 5.

An engineering tool program is also installed on the computer 5. The engineering tool program configures parameter settings for the PLC 4, the wireless master station 2, and the wireless slave stations 3A, 3B, 3C, 3D, 3E, 3F, 3G, and 3H. The engineering tool program also displays error information of the PLC 4, the wireless master station 2, and the wireless slave stations 3A, 3B, 3C, 3D, 3E, 3F, 3G, and 3H. The engineering tool program also creates a control program, and sends the control program to the PLC 4. The control program is executed by the PLC 4 for controlling an industrial machine.

In the communication system 1, the wireless master station 2 and the wireless slave stations 3A, 3B, 3C, 3D, 3E, 3F, 3G, and 3H autonomously construct the transmission routes based on a transmission environment. The transmission environment is exemplified by the quality of transmission or the number of repeater stations between the wireless master station 2 and the wireless slave stations 3A, 3B, 3C, 3D, 3E, 3F, 3G, and 3H.

The communication system 1 has a function of a mesh network. In a case where the transmission environment is deteriorated, the wireless master station 2 and the wireless slave stations 3A, 3B, 3C, 3D, 3E, 3F, 3G, and 3H search for alternative transmission routes before or after these stations become incommunicable, and construct transmission routes that bypass the place where the transmission environment has been deteriorated.

Therefore, the transmission routes through which the wireless master station 2 and the wireless slave stations 3A, 3B, 3C, 3D, 3E, 3F, 3G, and 3H communicate with one another are not fixed at the transmission routes C1, C2, C3, C4, C5, C6, C7, and C8 illustrated in FIG. 1. In other words, the transmission routes through which the wireless master station 2 and the wireless slave stations 3A, 3B, 3C, 3D, 3E, 3F, 3G, and 3H communicate with one another vary from moment to moment in accordance with the transmission environment.

Due to the variations in the transmission routes between the wireless master station 2 and the wireless slave stations 3A, 3B, 3C, 3D, 3E, 3F, 3G, and 3H, the number of repeater stations between the wireless master station 2 and the wireless slave stations 3A, 3B, 3C, 3D, 3E, 3F, 3G, and 3H also varies, and a response time between the wireless master station 2 and the wireless slave stations 3A, 3B, 3C, 3D, 3E, 3F, 3G, and 3H also varies.

Figure 2:
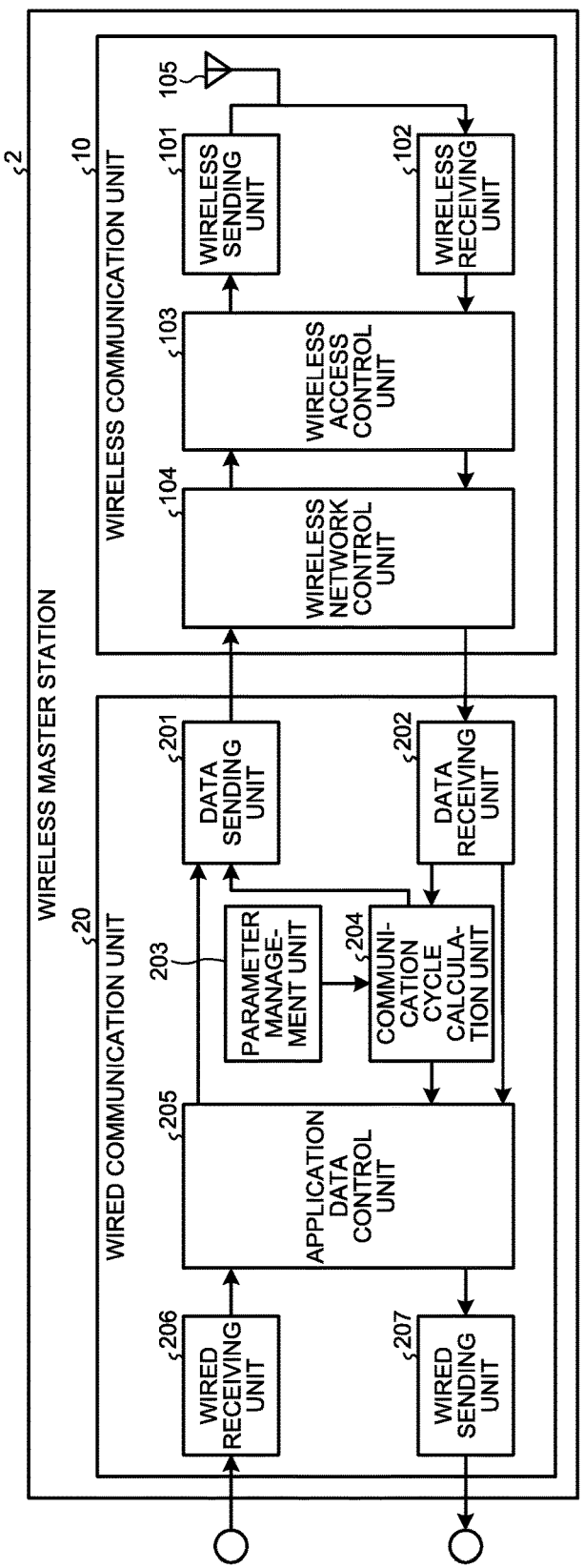
FIG. 2 is a diagram illustrating a configuration of a wireless master station of the system according to the first embodiment.

FIG. 2 is a diagram illustrating a configuration of the wireless master station of the system according to the first embodiment of the present invention. The wireless master station 2 includes a wireless communication unit 10 that performs wireless communication and a wired communication unit 20 that performs wired communication.

The wireless communication unit 10 includes a wireless sending unit 101, a wireless receiving unit 102, and a wireless access control unit 103. The wireless sending unit 101 modulates a wireless transmission frame into a radio frequency (RF) signal. The wireless receiving unit 102 demodulates a received RF signal into a wireless reception frame. The wireless access control unit 103 generates the wireless transmission frame, analyzes the wireless reception frame, and performs timing control for transmission and reception.

The wireless communication unit 10 also has a wireless network control unit 104 and an antenna 105. The wireless network control unit 104 acquires network configuration information including the maximum number of repeating stages and the number of wireless slave stations. The maximum number of repeating stages is the maximum value of the number of repeating stages between the wireless master station 2 and the wireless slave stations 3A, 3B, 3C, 3D, 3E, 3F, 3G, and 3H. The number of wireless slave stations is the total number of wireless slave stations 3A, 3B, 3C, 3D, 3E, 3F, 3G, and 3H. The antenna 105 sends and receives radio waves.

The network configuration information further includes information indicating partners connected to the wireless slave stations 3A, 3B, 3C, 3D, 3E, 3F, 3G, and 3H and information on the quality of transmission between the wireless slave stations 3A, 3B, 3C, 3D, 3E, 3F, 3G, and 3H and the partners connected thereto. The information on the quality of transmission is exemplified by reception electric field intensity.

The wireless sending unit 101 modulates the wireless transmission frame input from the wireless access control unit 103 into the RF signal, and sends the RF signal to the wireless slave stations 3A, 3B, 3C, 3D, 3E, 3F, 3G, and 3H via the antenna 105.

The wireless receiving unit 102 demodulates the RF signal received from the wireless slave stations 3A, 3B, 3C, 3D, 3E, 3F, 3G, and 3H via the antenna 105 into the wireless reception frame, and outputs the demodulated wireless reception frame to the wireless access control unit 103.

The wireless access control unit 103 generates the wireless transmission frame, analyzes the wireless reception frame, and performs the timing control for transmission and reception.

The wireless network control unit 104 monitors the transmission routes to the wireless slave stations 3A, 3B, 3C, 3D, 3E, 3F, 3G, and 3H in order to maintain and construct the transmission routes. For this purpose, the wireless network control unit 104 generates a wireless network frame for monitoring the transmission routes and analyzes a response to the wireless network frame.

The wired communication unit 20 includes a data sending unit 201 and a data receiving unit 202. The data sending unit 201 sends application transmission data to the wireless communication unit 10. The data receiving unit 202 receives application reception data from the wireless communication unit 10.

The wired communication unit 20 also includes a parameter management unit 203 that stores parameters including a delay time for communication.

The parameters include a repeating delay time that is a delay time for a case where the wireless slave stations 3A, 3B, 3C, 3D, 3E, 3F, 3G, and 3H perform repeating and a response delay time that is a delay time for a response during communication between the wireless master station 2 and the wireless slave stations 3A, 3B, 3C, 3D, 3E, 3F, 3G, and 3H.

The wired communication unit 20 also includes a communication cycle calculation unit 204 that calculates a communication cycle based on the network configuration information and the delay time for communication.

The wired communication unit 20 also includes an application data control unit 205, a wired receiving unit 206, and a wired sending unit 207. The application data control unit 205 generates the application transmission data based on a wired frame, and generates a wired frame based on the application reception data. The wired receiving unit 206 receives the wired frame. The wired sending unit 207 sends the wired frame.

The wired receiving unit 206 receives the wired frame from the PLC 4 via the wired network N1, and outputs the wired frame to the application data control unit 205.

The application data control unit 205 generates the application transmission data based on the wired frame, and outputs the application transmission data to the data sending unit 201.

The data sending unit 201 outputs the application transmission data input from the application data control unit 205 to the wireless network control unit 104 of the wireless communication unit 10.

The data receiving unit 202 outputs the application reception data input from the wireless network control unit 104 to the application data control unit 205.

The application data control unit 205 generates the wired frame based on the application reception data, and outputs the wired frame to the wired sending unit 207.

The wired sending unit 207 outputs the wired frame to the PLC 4 via the wired network N1.

The application data control unit 205 generates a control message required for monitoring the quality of transmission, transmission state, or transmission fault in the wireless network, and analyzes a response to the control message. The application data control unit 205 then outputs a wired frame indicating the generation result and the analysis result to the wired sending unit 207.

The wired frame which is the analysis result of the quality of transmission, transmission state, or transmission fault in the wireless network is sent to the computer 5 via the wired network N1, the PLC 4, and the wired network N2. The engineering tool program executed on the computer 5 displays the analysis result of the quality of transmission, transmission state, or transmission fault in the wireless network.

The communication cycle calculation unit 204 acquires the network configuration information from the wireless network control unit 104 via the data receiving unit 202.

The communication cycle calculation unit 204 acquires the network configuration information from the wireless network control unit 104, and acquires the parameters including the repeating delay time and the response delay time from the parameter management unit 203.

Then, the communication cycle calculation unit 204 calculates the communication cycle, and outputs the calculated communication cycle to the data sending unit 201. The data sending unit 201 generates application transmission data based on the communication cycle input from the communication cycle calculation unit 204, and outputs the application transmission data to the wireless network control unit 104.

The communication cycle calculation unit 204 also outputs the communication cycle to the application data control unit 205. The communication cycle is sent to the computer 5 via the application data control unit 205, the wired sending unit 207, the wired network N1, the PLC 4, and the wired network N2. The engineering tool program executed on the computer 5 displays the communication cycle.

Figure 3:
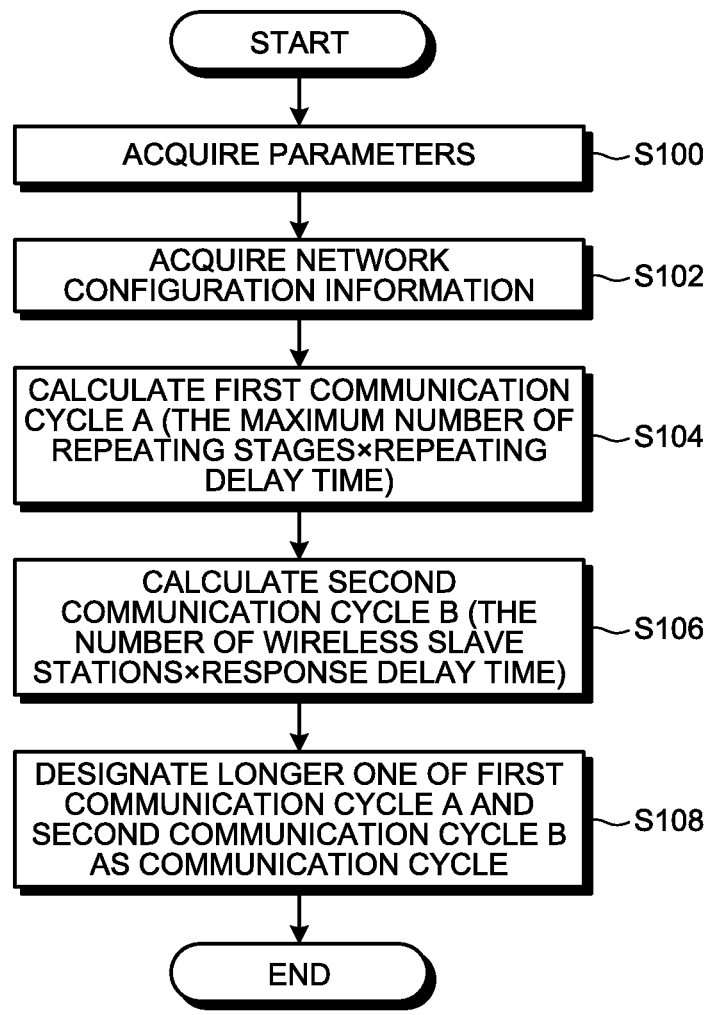
FIG. 3 is a flowchart illustrating a process of the wireless master station of the communication system according to the first embodiment.

FIG. 3 is a flowchart illustrating a process of the wireless master station of the communication system according to the first embodiment of the present invention.

In step S100, the communication cycle calculation unit 204 of the wireless master station 2 acquires the parameters from the parameter management unit 203.

In step S102, the communication cycle calculation unit 204 acquires the network configuration information from the wireless network control unit 104 via the data receiving unit 202.

In step S104, based on the maximum number of repeating stages included in the network configuration information acquired in step S102 and the repeating delay time included in the parameters acquired in step S100, the communication cycle calculation unit 204 calculates a first communication cycle A. More specifically, the communication cycle calculation unit 204 calculates the first communication cycle A by multiplying the maximum number of repeating stages and the repeating delay time.

Figure 4:
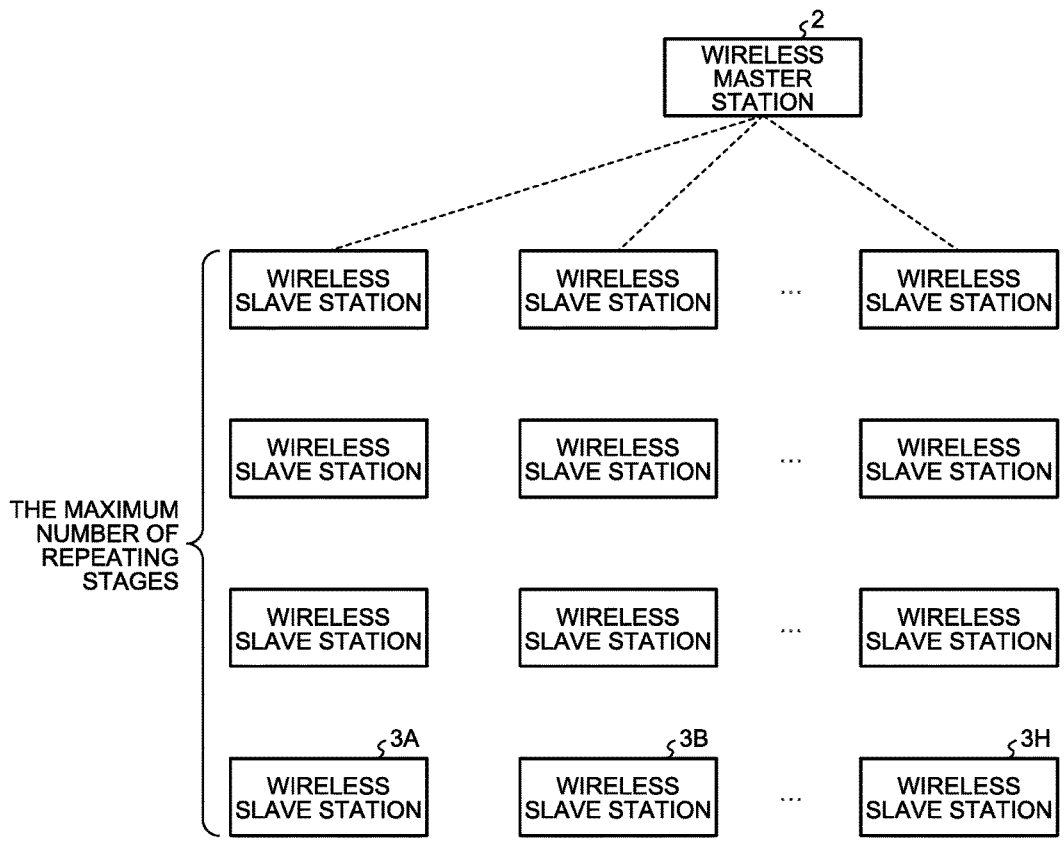
FIG. 4 is a diagram explaining calculation of a first communication cycle in the communication system according to the first embodiment.

FIG. 4 is a diagram explaining calculation of the first communication cycle in the communication system according to the first embodiment of the present invention. As illustrated in FIG. 4, the first communication cycle A is calculated on the assumption that the number of repeating stages from the wireless master station 2 to all the wireless slave stations 3A, 3B, 3C, 3D, 3E, 3F, 3G, and 3H is the maximum number of repeating stages included in the network configuration information. Although the maximum number of repeating stages in FIG. 4 is "four", the maximum number of repeating stages is not limited to "four".

Referring again to FIG. 3, in step S106, the communication cycle calculation unit 204 calculates a second communication cycle B based on the number of wireless slave stations included in the network configuration information acquired in step S102 and the response delay time included in the parameters acquired in step S100. More specifically, the communication cycle calculation unit 204 calculates the second communication cycle B by multiplying the number of wireless slave stations and the response delay time.

Figure 5:
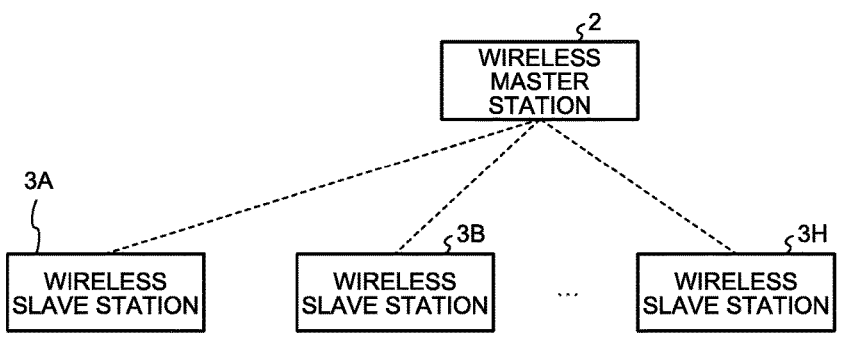
FIG. 5 is a diagram explaining calculation of a second communication cycle in the communication system according to the first embodiment.

FIG. 5 is a diagram explaining calculation of the second communication cycle in the communication system according to the first embodiment of the present invention. As illustrated in FIG. 5, the second communication cycle B is calculated on the assumption that the number of repeater stations between the wireless master station 2 and all the wireless slave stations 3A, 3B, 3C, 3D, 3E, 3F, 3G, and 3H is 0, that is, the wireless network is a star network without a repeater.

Referring again to FIG. 3, in step S108, the communication cycle calculation unit 204 designates longer one of the first communication cycle A and the second communication cycle B as the communication cycle.

The communication cycle calculation unit 204 outputs the calculated communication cycle to the data sending unit 201. The data sending unit 201 generates the application transmission data based on the communication cycle input from the communication cycle calculation unit 204, and outputs the application transmission data to the wireless network control unit 104. The communication cycle calculation unit 204 also outputs the communication cycle to the application data control unit 205.

The communication cycle is sent to the computer 5 via the application data control unit 205, the wired sending unit 207, the wired network N1, the PLC 4, and the wired network N2. The engineering tool program executed on the computer 5 displays the communication cycle.

In the above-described first embodiment, the wireless master station 2 uses the maximum number of repeating stages to calculate the first communication cycle A. Alternatively, the wireless master station 2 may use the average number of repeating stages.

In the above-described first embodiment, the wireless master station 2 uses the repeating delay time to calculate the first communication cycle A, and uses the response delay time to calculate the second communication cycle B. Alternatively, instead of the repeating delay time or the response delay time, the wireless master station 2 may use one or both of the size of data sent and received between the wireless slave stations 3A, 3B, 3C, 3D, 3E, 3F, 3G, and 3H and the wireless master station 2 and the number of retransmissions in a wireless section. The delay time increases as the size of data increases. The delay time increases as the number of retransmissions increases. Therefore, the wireless master station 2 may use the size of data or the number of retransmissions instead of the repeating delay time or the response delay time.

Furthermore, the wireless master station 2 may add a margin to the calculated communication cycle.

The wireless master station 2 according to the first embodiment described above has the following effects. In a case where a short communication cycle is set, traffic in the entire wireless network is congested, and the first problem occurs: the quality of transmission is liable to be deteriorated due to occurrence of a data collision in the wireless section. In contrast, in a case where a long communication cycle is set despite light traffic in the entire wireless network, the second problem occurs: a substantial amount of time is required for data collection.

By designating longer one of the first communication cycle A and the second communication cycle B as the communication cycle, the wireless master station 2 can suppress a data collision in the wireless section, and determine a suitable communication cycle for suppressing a delay in data collection. Consequently, the wireless master station 2 can suppress the first and second problems mentioned above.

In addition, the wireless master station 2 calculates the communication cycle based on the parameters stored in advance and the network configuration information acquired in advance. Therefore, the wireless master station 2 achieves an effect of eliminating the need for surveys or complicated measurement and control for the calculation of the communication cycle.

Second Embodiment

Figure 6:
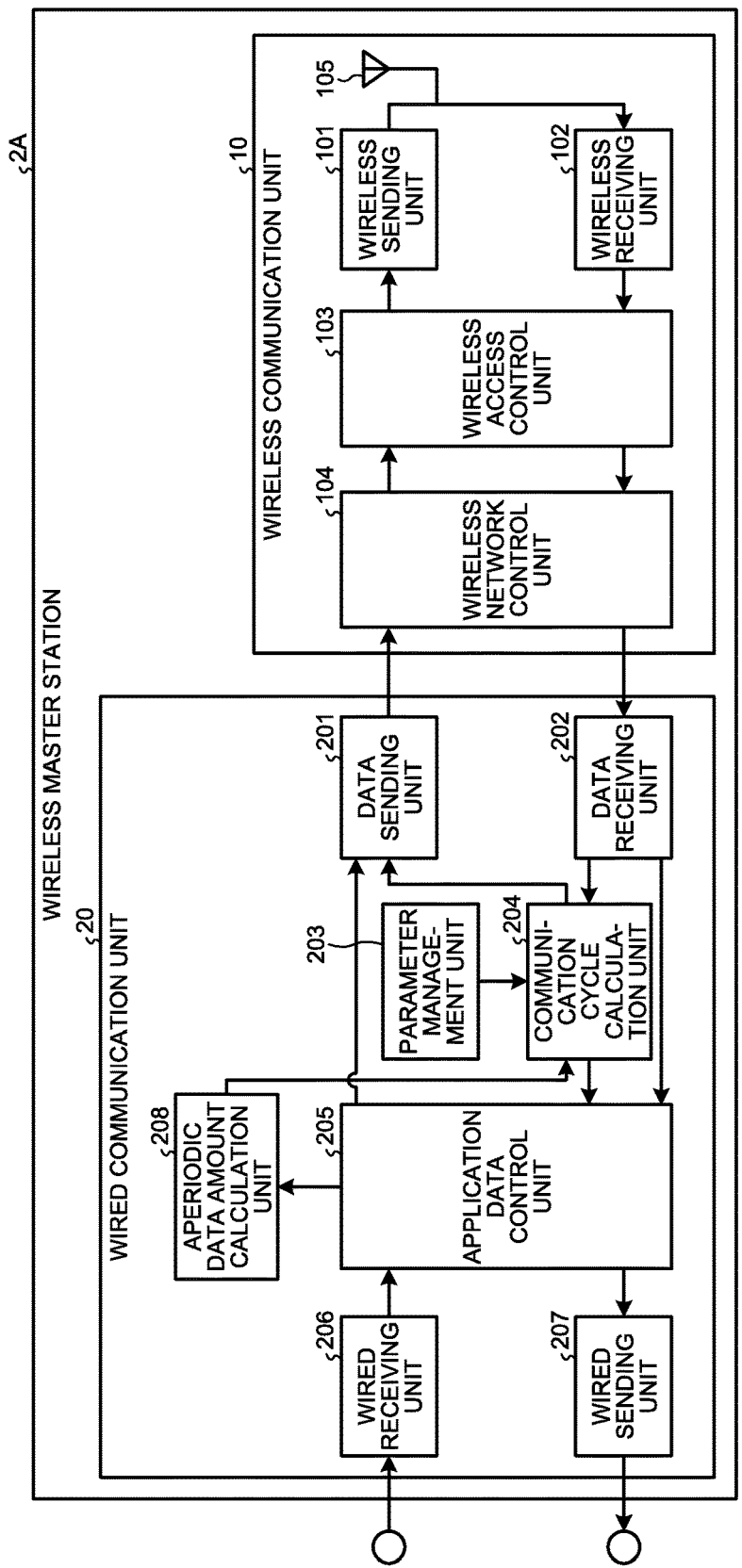
FIG. 6 is a diagram illustrating a configuration of a wireless master station of a communication system according to a second embodiment.

FIG. 6 is a diagram illustrating a configuration of a wireless master station of a communication system according to a second embodiment of the present invention. The wireless master station 2A according to the second embodiment further includes an aperiodic data amount calculation unit 208 in the wired communication unit 20 in addition to the configuration of the wireless master station 2 according to the first embodiment.

The aperiodic data amount calculation unit 208 calculates the data amount of aperiodic data. In contrast to the periodic data that are sent and received periodically, the aperiodic data are sent and received aperiodically. The aperiodic data are exemplified by data of message communication.

The aperiodic data amount calculation unit 208 acquires, from the application data control unit 205, the number of times that the aperiodic data have actually been sent and received per unit time or the total amount of aperiodic data that has actually been sent and received per unit time. Then, based on the number of times that the aperiodic data have actually been sent and received per unit time or the total amount of aperiodic data that has actually been sent and received per unit time, the aperiodic data amount calculation unit 208 calculates an aperiodic data amount ratio which is the ratio of the aperiodic data amount to the data amount of periodic data.

The aperiodic data amount calculation unit 208 outputs the calculated aperiodic data amount ratio to the communication cycle calculation unit 204. The communication cycle calculation unit 204 corrects the communication cycle based on the communication cycle calculated on the basis of the network configuration information, the repeating delay time, and the response delay time, and on the aperiodic data amount ratio, and outputs the corrected communication cycle to the data sending unit 201.

Figure 7:
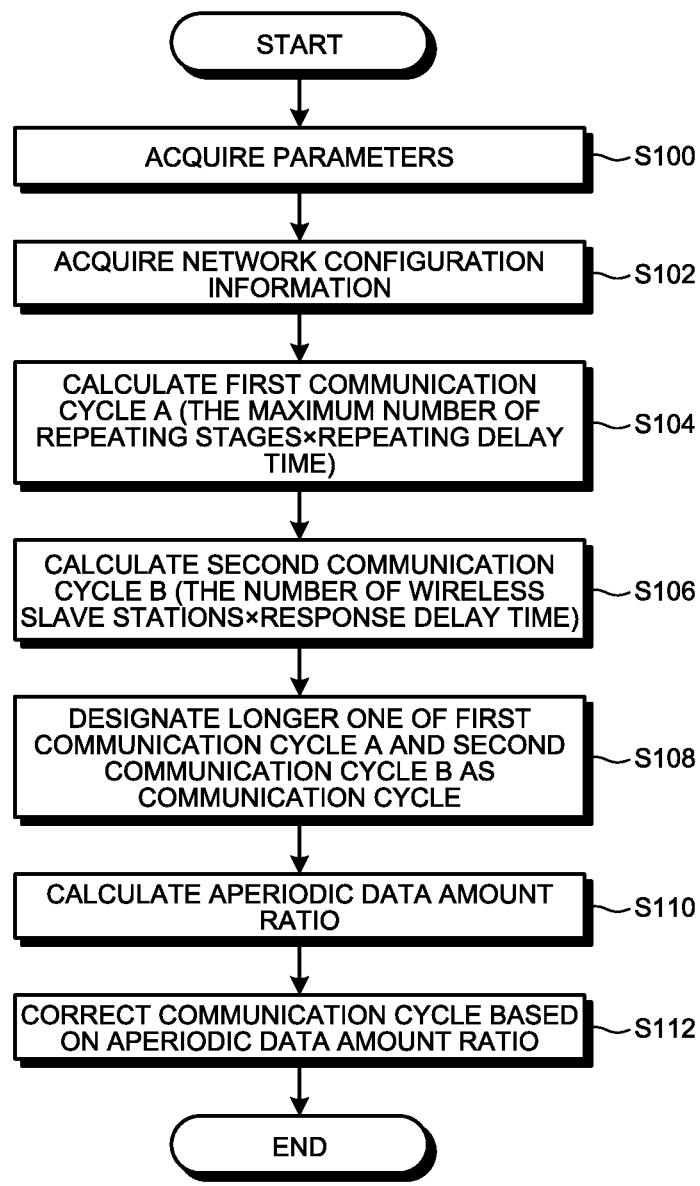
FIG. 7 is a flowchart illustrating a process of the wireless master station of the communication system according to the second embodiment.

FIG. 7 is a flowchart illustrating a process of the wireless master station of the communication system according to the second embodiment of the present invention. Since steps S100, S102, S104, S106, and S108 in the flowchart of FIG. 7 are similar to those in the flowchart illustrated in FIG. 3, the descriptions thereof are omitted.

In the flowchart of FIG. 7, steps S110 and S112 are added after step S108.

In step S110, based on the number of times that the aperiodic data have actually been sent and received per unit time or the total amount of aperiodic data that has actually been sent and received per unit time, the aperiodic data amount calculation unit 208 calculates the aperiodic data amount ratio which is the ratio of the aperiodic data amount to the data amount of periodic data. The aperiodic data amount calculation unit 208 outputs the calculated aperiodic data amount ratio to the communication cycle calculation unit 204.

In step S112, the communication cycle calculation unit 204 corrects the communication cycle determined in step S108 based on the aperiodic data amount ratio calculated in step S110.

It is preferable that the communication cycle calculation unit 204 correct and lengthen the communication cycle determined in step S108 by an amount corresponding to the aperiodic data amount sent and received.

More specifically, the communication cycle calculation unit 204 can correct the communication cycle using the following formula:

$$\text{(New communication cycle)}=\text{(Communication cycle determined in step S108)}\times(1+\text{aperiodic data amount ratio}) \quad (1).$$

The communication cycle calculation unit 204 outputs the corrected communication cycle to the data sending unit 201.

In the above-described second embodiment, the aperiodic data amount calculation unit 208 calculates the aperiodic data amount ratio based on the number of times that the aperiodic data have actually been sent and received per unit time or the total amount of aperiodic data that has actually been sent and received per unit time. Alternatively, the parameter management unit 203 may store, in advance as a parameter, one or both of the number of times that the aperiodic data are sent and received per unit time and the total amount of aperiodic data that is sent and received per unit time, and the aperiodic data amount calculation unit 208 may calculate the aperiodic data amount ratio based on the number of times that the aperiodic data are sent and received per unit time or the total amount of aperiodic data that is sent and received per unit time, which is stored in advance in the parameter management unit 203 as the parameter. In addition, the parameter management unit 203 may store the aperiodic data amount ratio in advance as a parameter.

The wireless master station 2A according to the second embodiment described above can correct the communication cycle based on the aperiodic data amount ratio. Therefore, the wireless master station 2A can achieve an effect of suppressing traffic congestion in the wireless network due to transmission and reception of the aperiodic data, and suppressing deterioration in the quality of transmission and reception of the periodic data.

Third Embodiment

Figure 8:
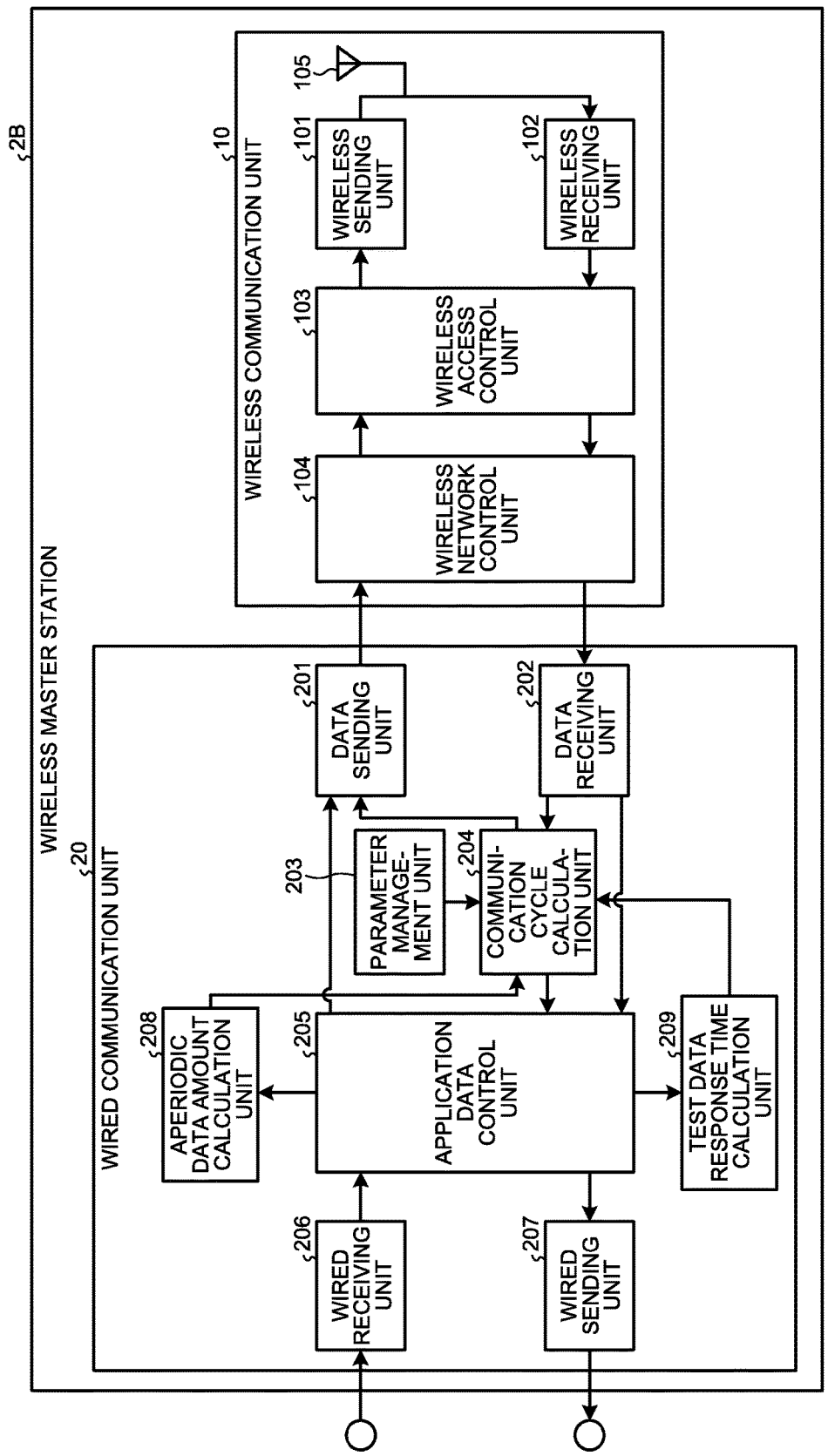
FIG. 8 is a diagram illustrating a configuration of a wireless master station of a communication system according to a third embodiment.

FIG. 8 is a diagram illustrating a configuration of a wireless master station of a communication system according to a third embodiment of the present invention. The wireless master station 2B according to the third embodiment further includes a test data response time calculation unit (209) 209 in the wired communication unit 20 in addition to the configuration of the wireless master station 2A according to the second embodiment.

The test data response time calculation unit (209) 209 sends and receives test data to and from the wireless slave stations 3A, 3B, 3C, 3D, 3E, 3F, 3G, and 3H, thereby calculating a test data response time which is a period of time from transmission of the test data to reception of the test data.

The application data control unit 205 outputs a transmission time point for the test data and a reception time point for the test data to the test data response time calculation unit (209) 209. The test data response time calculation unit (209) 209 can calculate the test data response time by calculating a difference between the transmission time point for the test data and the reception time point for the test data.

The test data response time calculation unit (209) 209 outputs the calculated test data response time to the communication cycle calculation unit 204. The communication cycle calculation unit 204 compares the test data response time with a first response time threshold value $ThRT_1$ stored in advance in the parameter management unit 203 as a parameter.

In a case where the test data response time is less than the response time threshold value ThRT1, the communication cycle calculation unit 204 corrects the communication cycle by multiplying the communication cycle by a correction value $\alpha_1$ stored in advance in the parameter management unit 203. The communication cycle calculation unit 204 outputs the corrected communication cycle to the data sending unit 201.

The fact that the test data response time is less than the response time threshold value ThRT1 suggests that the traffic in the entire wireless network is light. Therefore, it is preferable that the communication cycle calculation unit 204 correct and shorten the communication cycle by multiplying the communication cycle by the correction value $\alpha_1$ which is smaller than one.

In addition, the communication cycle calculation unit 204 compares the test data response time with a second response time threshold value ThRT2 stored in advance in the parameter management unit 203 as a parameter. Note that $ThRT_2 > ThRT_1$ is satisfied.

In a case where the test data response time is equal to or greater than the response time threshold value ThRT2, the communication cycle calculation unit 204 corrects the communication cycle by multiplying the communication cycle by a correction value $\alpha_2$ stored in advance in the parameter management unit 203. The communication cycle calculation unit 204 outputs the corrected communication cycle to the data sending unit 201.

The fact that the test data response time is equal to or greater than the response time threshold value ThRT2 suggests that the traffic in the entire wireless network is congested. Therefore, it is preferable that the communication cycle calculation unit 204 correct and lengthen the communication cycle by multiplying the communication cycle by the correction value $\alpha_2$ which is larger than one.

Figure 9:
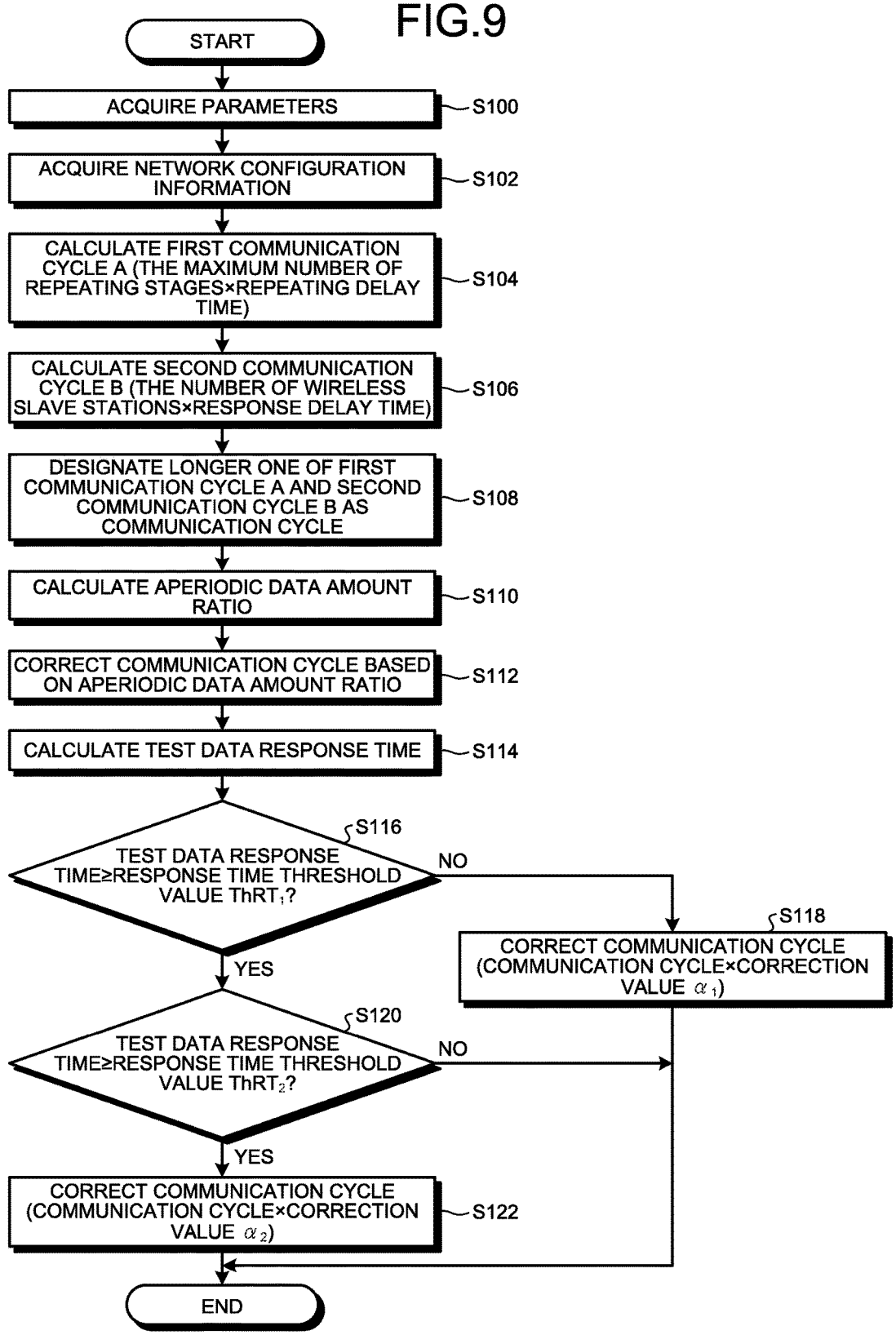
FIG. 9 is a flowchart illustrating a process of the wireless master station of the communication system according to the third embodiment.

FIG. 9 is a flowchart illustrating a process of the wireless master station of the communication system according to the third embodiment of the present invention. Since steps S100, S102, S104, S106, S108, S110, and S112 in the flowchart of FIG. 9 are similar to those in the flowchart illustrated in FIG. 7, the descriptions thereof are omitted.

In the flowchart of FIG. 9, steps S114, S116, S118, S120 and S122 are added after step S112.

The test data response time calculation unit 209 calculates the test data response time in step S114.

More specifically, the test data response time calculation unit 209 acquires the transmission time point for the test data and the reception time point for the test data from the application data control unit 205, and calculates the difference between the transmission time point for the test data and the reception time point for the test data, thereby calculating the test data response time. The test data response time calculation unit 209 outputs the calculated test data response time to the communication cycle calculation unit 204.

In step S116, the communication cycle calculation unit 204 acquires the first response time threshold value ThRT1 stored in advance in the parameter management unit 203, and compares the test data response time with the response time threshold value $ThRT_1$.

When the communication cycle calculation unit 204 determines that the test data response time is equal to or greater than the response time threshold value ThRT1 (Yes), the process advances to step S120, and when the communication cycle calculation unit 204 determines that the test data response time is less than the response time threshold value $ThRT_1$ (No), the process advances to step S118.

In step S118, the communication cycle calculation unit 204 corrects the communication cycle by multiplying the communication cycle by the correction value $\alpha_1$ stored in advance in the parameter management unit 203, and outputs the corrected communication cycle to the data sending unit 201. The process is then terminated.

The test data response time may be the average value or the maximum value of test data response times obtained through the transmission of the test data to all the wireless slave stations 3A, 3B, 3C, 3D, 3E, 3F, 3G, and 3H.

The response time threshold value ThRT1 may be a freely-determined value, may be determined on the basis of the maximum number of repeating stages and the repeating delay time, or may be determined on the basis of the number of wireless slave stations and the response delay time. In addition, a margin may be added to the determined response time threshold value $ThRT_1$.

Furthermore, the correction value $\alpha 1$ may be a freely-determined value, or may be determined on the basis of the ratio of the response time threshold value ThRT1 to the test data response time. In addition, a margin may be added to the determined correction value $\alpha_1$.

In step S120, the communication cycle calculation unit 204 acquires the second response time threshold value ThRT2 stored in advance in the parameter management unit 203, and compares the test data response time with the response time threshold value $ThRT_2$.

When the communication cycle calculation unit 204 determines that the test data response time is equal to or greater than the response time threshold value ThRT2 (Yes), the process advances to step S122, and when the communication cycle calculation unit 204 determines that the test data response time is less than the response time threshold value $ThRT_2$ (No), the process is terminated.

In step S122, the communication cycle calculation unit 204 corrects the communication cycle by multiplying the communication cycle by the correction value $\alpha_2$ stored in advance in the parameter management unit 203, and outputs the corrected communication cycle to the data sending unit 201. The process is then terminated.

The response time threshold value ThRT2 may be a freely-determined value, may be determined on the basis of the maximum number of repeating stages and the repeating delay time, or may be determined on the basis of the number of wireless slave stations and the response delay time. In addition, a margin may be added to the determined response time threshold value $ThRT_2$.

Furthermore, the correction value $\alpha 2$ may be a freely-determined value, or may be determined on the basis of the ratio of the response time threshold value ThRT2 to the test data response time. In addition, a margin may be added to the determined correction value $\alpha_2$.

In the third embodiment, steps S114, S116, S118, S120, and S122 are added after step S112 of the second embodiment illustrated in FIG. 7. Alternatively, steps S114, S116, S118, S120, and S122 may be added after step S108 of the first embodiment illustrated in FIG. 3.

The wireless master station 2B according to the third embodiment described above can correct the communication cycle based on the test data response time and the response time threshold values ThRT1 and ThRT2. Consequently, the wireless master station 2B can achieve an effect of taking account of the test data response time to determine a more suitable communication cycle.

Fourth Embodiment

Figure 10:
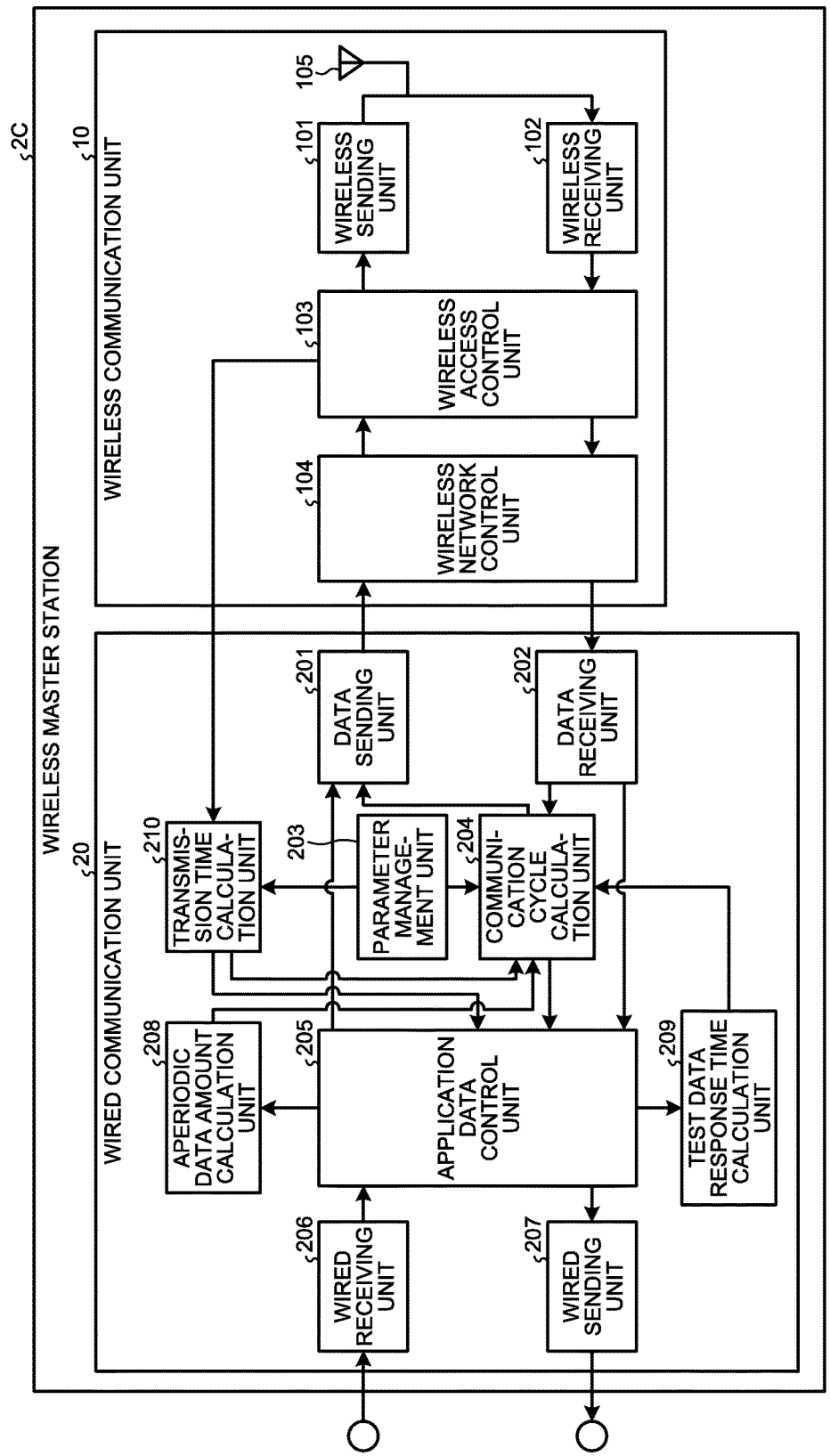
FIG. 10 is a diagram illustrating a configuration of a wireless master station of a communication system according to a fourth embodiment.

FIG. 10 is a diagram illustrating a configuration of a wireless master station of a communication system according to a fourth embodiment of the present invention. The wireless master station 2C according to the fourth embodiment further includes a transmission time calculation unit 210 in the wired communication unit 20 in addition to the configuration of the wireless master station 2B according to the third embodiment.

The transmission time calculation unit 210 calculates a transmission time for each wireless frame based on the number of transmission bytes of each wireless frame output from the wireless access control unit 103 and a transmission rate for wireless communication stored in advance in the parameter management unit 203. The transmission time calculation unit 210 can calculate the transmission time for each wireless frame by dividing the number of transmission bytes of each wireless frame by the transmission rate for wireless communication.

The transmission time calculation unit 210 accumulates transmission times for respective wireless frames to calculate a total transmission time per unit time.

The transmission time calculation unit 210 compares the total transmission time with a total transmission time threshold value ThTT stored in advance in the parameter management unit 203 as a parameter.

As the total transmission time threshold value ThTT, a total transmission time per unit time defined by a wireless communication standard can be adopted. Alternatively, a time shorter than the total transmission time per unit time defined by the wireless communication standard can be adopted as the total transmission time threshold value ThTT.

The transmission time calculation unit 210 does not correct the communication cycle in a case where the total transmission time is equal to or less than the total transmission time threshold value ThTT.

In contrast, in a case where the total transmission time exceeds the total transmission time threshold value ThTT, the transmission time calculation unit 210 notifies the computer 5 via the application data control unit 205 and the wired sending unit 207 that the total transmission time has exceeded the total transmission time threshold value ThTT, and also notifies the communication cycle calculation unit 204 of the same. The engineering tool program executed on the computer 5 displays the fact that the total transmission time has exceeded the total transmission time threshold value ThTT.

In response to receiving the notification indicating that the total transmission time has exceeded the total transmission time threshold value ThTT from the transmission time calculation unit 210, the communication cycle calculation unit 204 corrects the communication cycle by multiplying the communication cycle by a correction value β stored in advance in the parameter management unit 203. The communication cycle calculation unit 204 outputs the corrected communication cycle to the data sending unit 201.

The fact that the total transmission time has exceeded the total transmission time threshold value ThTT suggests that the traffic in the entire wireless network is congested. Therefore, it is preferable that the communication cycle calculation unit 204 correct and lengthen the communication cycle by multiplying the communication cycle by the correction value β which is larger than one.

Figure 11:
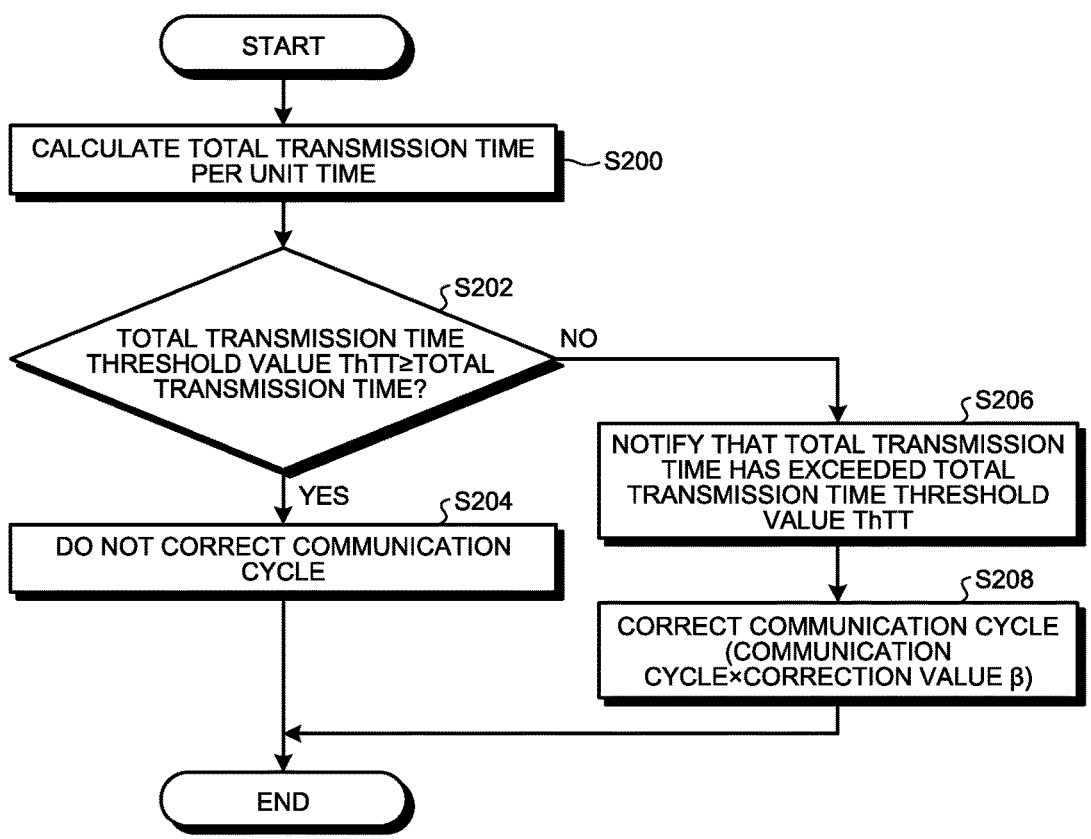
FIG. 11 is a flowchart illustrating a process of the wireless master station of the communication system according to the fourth embodiment.

FIG. 11 is a flowchart illustrating a process of the wireless master station of the communication system according to the fourth embodiment of the present invention. The wireless master station 2C executes the process illustrated in FIG. 11 after the process illustrated in FIG. 3, 7, or 9.

In step S200, the transmission time calculation unit 210 calculates the total transmission time per unit time.

More specifically, the transmission time calculation unit 210 acquires the number of transmission bytes of each wireless frame output from the wireless access control unit 103. Then, the transmission time calculation unit 210 calculates the transmission time for each wireless frame based on the number of transmission bytes of each wireless frame and the transmission rate for wireless communication stored in advance in the parameter management unit 203. Furthermore, the transmission time calculation unit 210 accumulates the transmission times for the respective wireless frames to calculate the total transmission time per unit time.

The transmission time calculation unit 210 sequentially executes the process of step S200. Each time the transmission time calculation unit 210 calculates the total transmission time per unit time in step S200, the transmission time calculation unit 210 executes the process in step S202 and subsequent steps.

In step S202, the transmission time calculation unit 210 acquires the total transmission time threshold value ThTT stored in advance in the parameter management unit 203, and compares the total transmission time with the total transmission time threshold value ThTT.

When the transmission time calculation unit 210 determines that the total transmission time is equal to or less than the total transmission time threshold value ThTT (Yes), the process advances to step S204, and when the transmission time calculation unit 210 determines that the total transmission time exceeds the total transmission time threshold value ThTT (No), the process advances to step S206.

In step S204, the transmission time calculation unit 210 does not correct the communication cycle, and terminates the process.

In contrast, in step S206, the transmission time calculation unit 210 notifies the application data control unit 205 and the communication cycle calculation unit 204 that the total transmission time has exceeded the total transmission time threshold value ThTT.

In step S208, the communication cycle calculation unit 204 corrects the communication cycle by multiplying the communication cycle by the correction value β stored in advance in the parameter management unit 203, and outputs the corrected communication cycle to the data sending unit 201.

The correction value β may be a freely-determined value, or may be determined on the basis of the ratio of the total transmission time threshold value ThTT to the total transmission time. In addition, a margin may be added to the determined correction value β.

The wireless master station 2C according to the fourth embodiment described above can correct the communication cycle based on the total transmission time per unit time and the total transmission time threshold value ThTT. Consequently, the wireless master station 2C can achieve an effect of suppressing termination of radio waves due to the total transmission time exceeding the total transmission time threshold value ThTT.

Fifth Embodiment

The configuration of the wireless master station 2C according to the fifth embodiment of the present invention is similar to the configuration of the wireless master station 2C according to the fourth embodiment illustrated in FIG. 10.

Figure 12:
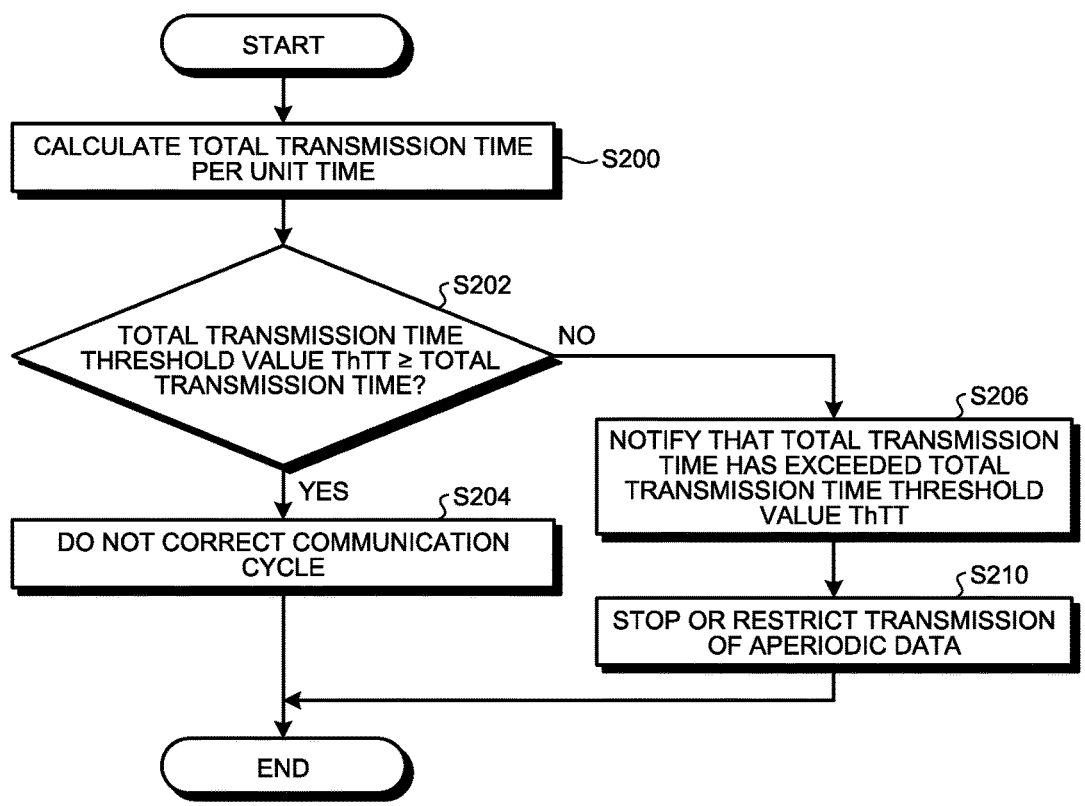
FIG. 12 is a flowchart illustrating a process of a wireless master station of a communication system according to a fifth embodiment.

FIG. 12 is a flowchart illustrating a process of the wireless master station of the communication system according to the fifth embodiment of the present invention. The flowchart illustrated in FIG. 12 includes step S210 in place of step S208 in the flowchart according to the fourth embodiment illustrated in FIG. 11. The wireless master station 2C executes the process illustrated in FIG. 12 after the process illustrated in FIG. 3, 7, or 9.

In the fifth embodiment, in a case where the total transmission time exceeds the threshold value ThTT, the transmission time calculation unit 210 notifies the computer 5 via the application data control unit 205 and the wired sending unit 207 that the total transmission time has exceeded the total transmission time threshold value ThTT. The engineering tool program executed on the computer 5 displays the fact that the total transmission time has exceeded the total transmission time threshold value ThTT.

In response to receiving the notification indicating that the total transmission time has exceeded the total transmission time threshold value ThTT from the transmission time calculation unit 210, the application data control unit 205 stops or restricts the transmission of the aperiodic data.

Referring to FIG. 12, in step S206, the transmission time calculation unit 210 notifies the application data control unit 205 that the total transmission time has exceeded the total transmission time threshold value ThTT.

In response to receiving the notification indicating that the total transmission time has exceeded the total transmission time threshold value ThTT from the transmission time calculation unit 210 in step S210, the application data control unit 205 stops or restricts the transmission of the aperiodic data.

The application data control unit 205 may restrict the transmission of the aperiodic data so that the ratio between the periodic data and the aperiodic data becomes a freely-determined ratio. Alternatively, the application data control unit 205 may restrict the transmission of the aperiodic data so that the ratio between the periodic data and the aperiodic data becomes equal to the ratio of the total transmission time threshold value ThTT to the total transmission time.

The wireless master station 2C according to the fifth embodiment described above can stop or restrict the transmission of the aperiodic data based on the total transmission time per unit time and the total transmission time threshold value ThTT. Consequently, the wireless master station 2C can achieve an effect of suppressing termination of radio waves due to the total transmission time exceeding the total transmission time threshold value ThTT. In addition, the wireless master station 2C can achieve an effect of suppressing deterioration in the quality of transmission of the periodic data due to the total transmission time exceeding the total transmission time threshold value ThTT.

The configuration described in the above-mentioned embodiments indicates an example of the contents of the present invention. The configuration can be combined with another well-known technique, and a part of the configuration can be omitted or changed in a range not departing from the gist of the present invention.

REFERENCE SIGNS LIST 1 communication system, 2 wireless master station, 3A, 3B, 3C, 3D, 3E, 3F, 3G, 3H wireless slave station, 4 PLC, 5 computer, 10 wireless communication unit, 101 wireless sending unit, 102 wireless receiving unit, 103 wireless access control unit, 104 wireless network control unit, 20 wired communication unit, 201 data sending unit, 202 data receiving unit, 203 parameter management unit, 204 communication cycle calculation unit, 205 application data control unit, 206 wired receiving unit, 207 wired sending unit, 208 aperiodic data amount calculation unit, 209 test data response time calculation unit (209), 210 transmission time calculation unit.

The invention claimed is:

1. A communication device to wirelessly communicate with a plurality of wireless slave stations, the communication device comprising:
 a wireless network controller to
  acquire network configuration information including a number of repeating stages between the communication device and the plurality of wireless slave stations and a total number of the plurality of wireless slave stations, and
  acquire a maximum number of repeating stages between the communication device and the plurality of wireless slave stations;
 a parameter management circuit to store a repeating delay time that occurs when the plurality of wireless slave stations repeat data transmission, and a response delay time that elapses to receive a response from the plurality of wireless slave stations in response to the data transmission; and
 a hardware processor comprising a communication cycle calculator to
  calculate a first communication cycle by multiplying the maximum number of repeating stages and the repeating delay time based on a first setting in which the number of the repeating stages from the communication device to all of the plurality of wireless slaves is set to the maximum number of repeating stages included in the network configuration information,
  calculate a second communication cycle by multiplying the total number of wireless slave stations and the response delay time based on a second setting in which the number of the repeating stages from the communication device to all of the plurality of wireless slaves is set to zero, and
  set a communication cycle, in which data is transmitted from the communication device to the plurality of wireless slave stations, to a longer communication cycle of the first communication cycle and the second communication cycle,
 a test data response time calculator to calculate a test data response time that is a period of time from transmission of test data to reception of the data, wherein
 the parameter management circuit further stores: a response time threshold value that is a threshold value to be compared with the test data response time; and a correction value that is smaller than one, and
 in response to the test data response time being less the response time threshold value, the communication cycle calculator corrects and shortens the communication cycle by multiplying the communication cycle by the correction value.

2. The communication device according to claim 1, wherein
 the parameter management circuit further stores: another correction value that is larger than one, and
 in response to the test data response time being equal to or greater than the response time threshold value, the communication cycle calculator corrects and lengthens the communication cycle by multiplying the communication cycle by other correction value that is larger than one.

3. A communication system comprising:
a plurality of wireless slave stations; and
the communication device according to claim 2 to wirelessly communicate with the plurality of wireless slave stations.

4. The communication device according to claim 1, further comprising:
a transmission time calculator to calculate a total transmission time per unit time, wherein
the communication cycle calculator corrects the communication cycle based on the total transmission time.

5. A communication system comprising:
a plurality of wireless slave stations; and
the communication device according to claim 4 to wirelessly communicate with the plurality of wireless slave stations.

6. The communication device according to claim 1, further comprising
a transmission time calculator to calculate a total transmission time per unit time; wherein
the parameter management circuit further stores: a total transmission time threshold value that is a threshold value to be compared with the total transmission time; and another correction value that is larger than one, and in response to the total transmission time exceeding the total transmission time threshold value, the communication cycle calculator corrects and lengthens the communication cycle by multiplying the communication cycle by the other correction value that is larger than one.

7. The communication device according to claim 1, further comprising:
a transmission time calculator to calculate a total transmission time per unit time; and
an application data controller to stop or restrict transmission of aperiodic data based on the total transmission time.

8. The communication device according to claim 7, wherein the parameter management circuit further stores a total transmission time threshold value that is a threshold value to be compared with the total transmission time, and
in response to the total transmission time exceeding the total transmission time threshold value, the application data controller stops or restricts the transmission of the aperiodic data.

9. A communication system comprising:
a plurality of wireless slave stations; and
the communication device according to claim 7 to wirelessly communicate with the plurality of wireless slave stations.

10. A communication system comprising:
a plurality of wireless slave stations; and
the communication device according to claim 8 to wirelessly communicate with the plurality of wireless slave stations.

11. A communication system comprising:
a plurality of wireless slave stations; and
the communication device according to claim 1 to wirelessly communicate with the plurality of wireless slave stations.

12. A communication device to wirelessly communicate with a plurality of wireless slave stations, the communication device comprising:
a wireless network controller to acquire network configuration information including a number of repeating stages between the communication device and the plurality of wireless slave stations and a total number of the plurality of wireless slave stations;
a parameter management circuit to store a delay time for communication; and
a hardware processor comprising:
a communication cycle calculator to calculate a first communication cycle by multiplying a maximum number of the repeating stages and the delay time based on a first setting in which the number of the repeating stages from the communication device to all of the plurality of wireless slaves is set to the maximum number of repeating stages included in the network configuration information, calculate a second communication cycle by multiplying the total number of the plurality of wireless slave stations and the delay time based on a second setting in which the number of the repeating stages from the communication device to all of the plurality of wireless slaves is set to zero, and calculate a communication cycle, in which data is transmitted from the communication device to the plurality of wireless slave stations, to a longer communication cycle of the first communication cycle and the second communication cycle, based on the network configuration information and the delay time,
an aperiodic data amount calculator to calculate a data amount of aperiodic data that is sent and received aperiodically between the communication device and the plurality of wireless slave stations, and
a test data response time calculator to calculate a test data response time that is a period of time from transmission of test data to reception of the test data, wherein
the communication cycle calculator corrects the communication cycle based on the data amount of aperiodic data
the parameter management circuit further stores: a response time threshold value that is a threshold value to be compared with the test data response time; and a correction value that is smaller than one, and
in response to the test data response time being less than the response time threshold value, the communication cycle calculator shortens the corrected communication cycle by multiplying the communication cycle by the correction value.

13. A communication system comprising:
a plurality of wireless slave stations; and
the communication device according to claim 12 to wirelessly communicate with the plurality of wireless slave stations.

14. The communication device according to claim 12, wherein
the aperiodic data amount calculator calculates an aperiodic data amount ratio of the data amount of the aperiodic data to a data amount of periodic data, and
when the communication cycle calculator corrects the communication cycle, the communication cycle calculator corrects the communication cycle by lengthening the communication cycle by an amount corresponding to the data amount of the aperiodic data.

15. A communication system comprising:
a plurality of wireless slave stations; and
the communication device according to claim 14 to wirelessly communicate with the plurality of wireless slave stations.

16. A communication method to be executed by a communication device that wirelessly communicates with a plurality of wireless slave stations, the communication method comprising:

acquiring network configuration information including a number of repeating stages between the communication device and the plurality of wireless slave stations and a total number of the plurality of wireless slave stations;

acquiring a maximum number of repeating stages between the communication device and the plurality of wireless slave stations;

storing a repeating delay time that occurs when the plurality of wireless slave stations repeat data transmission, and a response delay time that elapses to receive a response from the plurality of wireless slave stations in response to the data transmission;

calculating a first communication cycle by multiplying the maximum number of repeating stages and the repeating delay time based on a first setting in which the number of the repeating stages from the communication device to all of the plurality of wireless slaves is set to the maximum number of repeating stages included in the network configuration information;

calculating a second communication cycle by multiplying the total number of wireless slave stations and the response delay time based on a second setting in which the number of repeating stages from the communication device to all of the plurality of wireless slaves is set to zero;

setting a communication cycle, in which data is transmitted from the communication device to the plurality of wireless slave stations, to a longer communication cycle of the first communication cycle and the second communication cycle;

calculating a test data response time that is a period of time from transmission of test data to reception of the test data;

storing a response time threshold value that is a threshold value to be compared with the test data response time, and a correction value that is smaller than one; and in response to the test data response time being less than the response time threshold value, correcting and shorting the communication cycle by multiplying the communication cycle by the correction value.

* * * * *